United States Patent
Yanagisawa

(10) Patent No.: US 10,949,946 B2
(45) Date of Patent: Mar. 16, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takafumi Yanagisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/298,939

(22) Filed: Mar. 11, 2019

(65) Prior Publication Data

US 2019/0287212 A1 Sep. 19, 2019

(30) Foreign Application Priority Data

Mar. 13, 2018 (JP) .............................. JP2018-044916

(51) Int. Cl.
| | |
|---|---|
| *G06T 3/00* | (2006.01) |
| *G06K 9/00* | (2006.01) |
| *G06K 9/20* | (2006.01) |
| *G08B 13/196* | (2006.01) |
| *G08B 29/26* | (2006.01) |
| *H04N 5/232* | (2006.01) |

(52) U.S. Cl.
CPC ........ *G06T 3/0018* (2013.01); *G06K 9/00362* (2013.01); *G06K 9/00771* (2013.01); *G06K 9/209* (2013.01); *G08B 13/19628* (2013.01); *G08B 29/26* (2013.01); *H04N 5/23218* (2018.08)

(58) Field of Classification Search
CPC .............. G06T 3/0018; G06K 9/00362; G06K 9/00771; G06K 9/209; G08B 13/19628; G08B 29/26; H04N 5/23218
See application file for complete search history.

(56) References Cited

U.S. PATENT DOCUMENTS

| | | | |
|---|---|---|---|
| 10,108,867 B1* | 10/2018 | Vallespi-Gonzalez | G01S 17/86 |
| 2004/0256541 A1* | 12/2004 | Cofer | G06T 7/254 |
| | | | 250/221 |
| 2006/0045311 A1* | 3/2006 | Shibuya | G06T 7/20 |
| | | | 382/103 |
| 2006/0215881 A1* | 9/2006 | Nakajima | G01B 11/024 |
| | | | 382/106 |
| 2006/0227862 A1* | 10/2006 | Campbell | G06T 7/254 |
| | | | 375/240 |

(Continued)

FOREIGN PATENT DOCUMENTS

| | | |
|---|---|---|
| CN | 105979134 A | 9/2016 |
| JP | 2010199713 A | 9/2010 |

(Continued)

*Primary Examiner* — Anner N Holder
(74) *Attorney, Agent, or Firm* — Canon U.S.A., Inc. IP Division

(57) ABSTRACT

An image processing apparatus (client apparatus) includes an obtaining unit configured to obtain a fisheye image captured by an imaging unit including a fisheye lens, a detection unit configured to detect an object having a specific size as a detection target object from the fisheye image obtained by the obtaining unit, and a setting unit configured to set a size of the detection target object to be detected by the detection unit based on a distance from a reference position in the fisheye image and a height at which the imaging unit is installed.

17 Claims, 14 Drawing Sheets

(56) References Cited

U.S. PATENT DOCUMENTS

| | | | |
|---|---|---|---|
| 2006/0267764 A1* | 11/2006 | Morinaga | G01S 13/04 340/545.3 |
| 2007/0024704 A1* | 2/2007 | Lin | G06T 7/80 348/135 |
| 2007/0070190 A1 | 3/2007 | Yin | |
| 2007/0162248 A1* | 7/2007 | Hardin | G08B 13/19641 702/142 |
| 2007/0229797 A1* | 10/2007 | Sugimoto | G01C 3/08 356/4.03 |
| 2008/0074256 A1* | 3/2008 | Hirai | G08B 21/22 340/541 |
| 2008/0166017 A1* | 7/2008 | Ito | G08B 13/1968 382/103 |
| 2012/0081592 A1* | 4/2012 | Lim | H04N 5/232939 348/333.04 |
| 2014/0022394 A1* | 1/2014 | Bae | G06K 9/00624 348/169 |
| 2014/0193034 A1 | 7/2014 | Oami | |
| 2014/0293043 A1* | 10/2014 | Datta | G06T 5/006 348/135 |
| 2015/0199810 A1* | 7/2015 | Lee | G06T 7/246 382/103 |
| 2016/0227106 A1* | 8/2016 | Adachi | G06K 9/00221 |
| 2018/0052225 A1* | 2/2018 | Bohme | G01S 7/4861 |
| 2018/0330175 A1* | 11/2018 | Corcoran | G06K 9/209 |

FOREIGN PATENT DOCUMENTS

| | | |
|---|---|---|
| JP | 201311950 A | 1/2013 |
| JP | 2015-104016 A | 6/2015 |

* cited by examiner

| DISTANCE FROM CENTER [px] (221a) | DISTANCE IN REAL SPACE [m] (221b) |
|---|---|
| 100 | 2 |
| 200 | 5 |
| 300 | 10 |
| 400 | 17 |
| 500 | 30 |

| INSTALLATION HEIGHT [m] |
|---|
| 3 |

*221c*

| DETECTION TARGET HEIGHT [m] |
|---|
| 1.5 |

| DETECTION COORDINATE (x) [px] | DETECTION COORDINATE (y) [px] | DETECTION SIZE [px] |
|---|---|---|
| 500 | 400 | 20 |
| 200 | 800 | 50 |
| 300 | 100 | 80 |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

Network cameras have been diversifying in recent years, and omnidirectional network cameras (hereinafter, referred to as "omnidirectional cameras") that provide a 360° view around without a blind spot are starting to be widespread. As the network camera market expands, techniques for detecting people and objects from a captured image have often been used. Such techniques are used to detect a congestion level.

In human body detection in an image, an object having an improbable size as a captured image of a human body is sometimes detected as a human body depending on camera installation conditions. Frequent occurrence of such misdetections makes appropriate image analysis difficult.

Japanese Patent Application Laid-Open No. 2013-11950 discusses a technique in which, if there are detection results of a plurality of people in close proximity to each other in an image, detected sizes of the detection results are compared to each other to determine whether to use each detection result as a detection target.

An image captured by an omnidirectional camera is a fisheye image captured using a fisheye lens. Such an image is characterized in that human bodies of similar sizes in the real space appear in different sizes even if the human bodies are at a close distance in the captured image. Thus, even with the technique discussed in the foregoing Japanese Patent Application Laid-Open No. 2013-11950, misdetections sometimes cannot be reduced in human body detection using an omnidirectional camera.

The present invention is directed to improving detection accuracy in detecting a detection target object from a fisheye image.

SUMMARY OF THE INVENTION

According to an aspect of the present invention, to improve detection accuracy in detecting a detection target object from a fisheye image, an image processing apparatus includes an obtaining unit configured to obtain a fisheye image captured by an imaging unit including a fisheye lens, a detection unit configured to detect an object having a specific size as a detection target object from the fisheye image obtained by the obtaining unit, and a setting unit configured to set a size of the detection target object to be detected by the detection unit based on a distance from a reference position in the fisheye image and a height at which the imaging unit is installed.

Further features of the present invention will become apparent from the following description of exemplary embodiments with reference to the attached drawings.

BRIEF DESCRIPTION OF THE DRAWINGS

FIG. 4 is a diagram illustrating an example of environment information data.

FIG. 8 is a diagram illustrating an example of human body detection result data.

DESCRIPTION OF THE EMBODIMENTS

A mode for implementing the present invention will be described in detail below with reference to the accompanying drawings.

The exemplary embodiments described below are examples of means for implementing the present invention, and are to be modified or changed as appropriate depending on the configuration of an apparatus to which the present invention is applied as well as various conditions. The present invention is not limited to the following exemplary embodiments.

Figure 1:
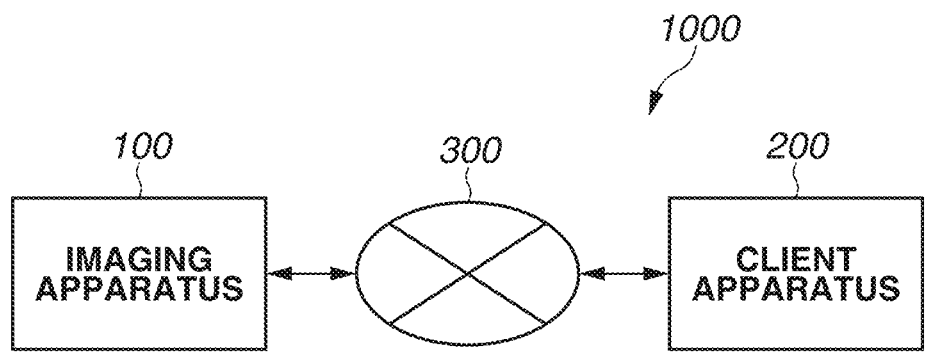
FIG. 1 is a diagram illustrating a configuration example of a network camera system.

FIG. 1 is a block diagram illustrating a configuration example of a network camera system 1000 according to an exemplary embodiment of the present invention.

The network camera system 1000 according to the present exemplary embodiment is a system that provides a captured image of a monitoring area for a user who monitors the monitoring area. The network camera system 1000 can perform image analysis processing on the captured image of the monitoring area to detect an object having a specific size as a detection target object, and provide the detection result to the user. As employed herein, the detection target object may be a human body or a part of a human body.

The network camera system 1000 includes an imaging apparatus (imaging unit) 100 and a client apparatus (image processing apparatus) 200. The imaging apparatus 100 and the client apparatus 200 are connected to each other by a network 300 to communicate with each other.

The network 300 includes, for example, a plurality of routers, switches, and cables compliant with the Ethernet (registered trademark) communication standard. The communication standard, scale, and configuration of the network 300 are not limited in particular as long as the network 300 is configured to allow communication between the camera 100 and the client apparatus 200. The network 300 may be implemented by the Internet, a wired local area network (LAN), a wireless LAN, a wide area network (WAN), or a combination of these.

The imaging apparatus 100 is a network camera (hereinafter, referred to simply as "camera") that captures an image of a predetermined imaging range, and can distribute the captured image to the client apparatus 200 via the network 300. The camera 100 includes a fisheye lens and can obtain a fisheye image (omnidirectional image) as the captured image. For example, the camera 100 is installed on the ceiling of a facility and captures objects such as a person passing under the camera 100 and the background.

According to the present exemplary embodiment, the camera 100 has an omnidirectional (360°) imaging range. However, the imaging range is not limited to an omnidirectional imaging range, and may be a predetermined angle range narrower than the omnidirectional imaging range. The camera 100 may be a camera that captures a single image (still image) or a camera that captures a video image including one or more images.

The client apparatus 200 can be implemented by a terminal apparatus, such as a personal computer (PC), a smartphone, and a tablet PC. The client apparatus 200 can control the camera 100, perform control of image analysis processing on a fisheye image distributed from the camera 100, and perform display control to provide a processing result of the image analysis processing to the user, for example.

Figure 2:
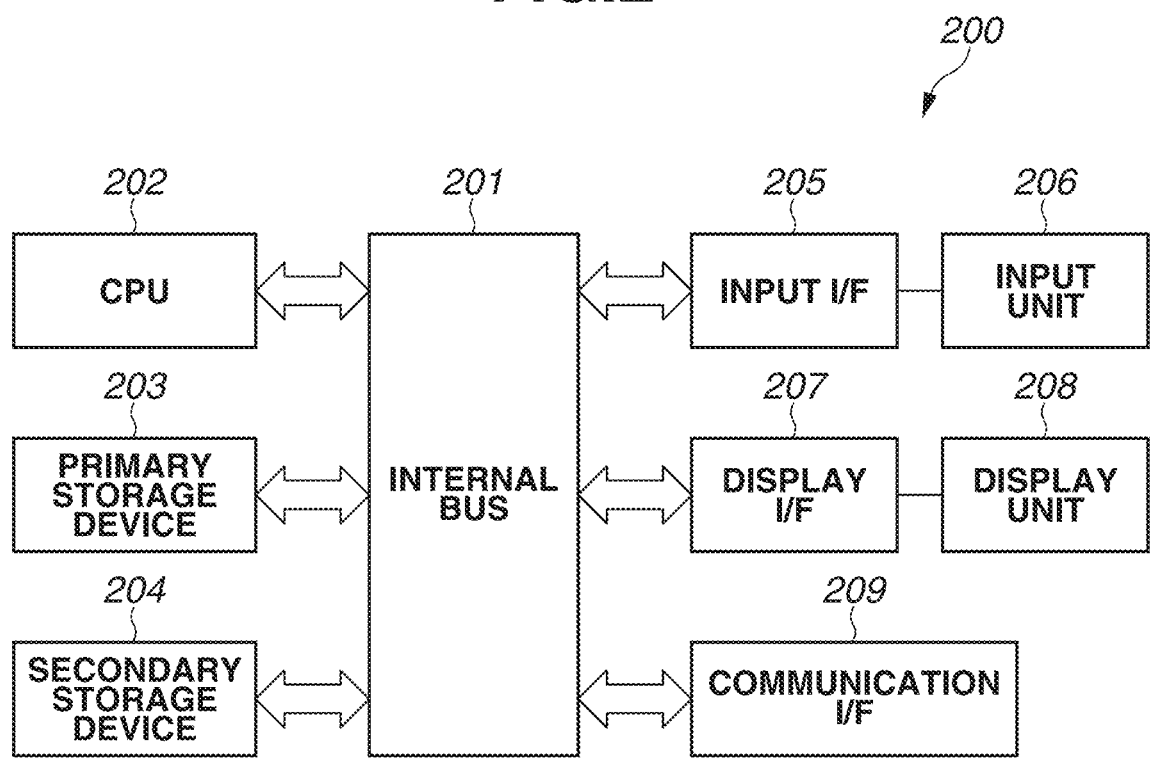
FIG. 2 is a diagram illustrating a hardware configuration example of a client apparatus.

FIG. 2 is a diagram illustrating a hardware configuration example of the client apparatus 200.

The client apparatus 200 includes an internal bus 201. The client apparatus 200 also includes a central processing unit (CPU) 202, a primary storage device 203, a secondary storage device 204, an input interface (I/F) 205, an input unit 206, a display I/F 207, a display unit 208, and a communication I/F 209. The CPU 202, the primary storage device 203, the secondary storage device 204, the input I/F 205, the display I/F 207, and the communication I/F 209 are connected to the internal bus 201.

The CPU 202 controls operation of the client apparatus 200 in a centralized manner. An example of the primary storage device 203 is a writable high-speed storage device typified by a random access memory (RAM). For example, an operating system (OS), various programs, and various types of data are loaded into the primary storage device 203. The primary storage device 203 is also used as a work area when the CPU 202 executes the OS and various programs. Thus, the CPU 202 serves to control operation of the programs stored by the primary storage device 203. For example, the CPU 202 serves as a detection unit 215 (by controlling operation of the human body detection program), and a setting unit 214 (by controlling operation of the threshold calculation program).

Functions and processing of the client apparatus 200 to be described below are implemented by reading the programs stored in the primary storage device 203 and executing the programs by the CPU 202.

The secondary storage device 204 is a nonvolatile storage device typified by, for example, a hard disk drive (HDD), a flash memory, and a Secure Digital (SD) card. The secondary storage device 204 may have a detachably attachable configuration. The secondary storage device 204 is used as a persistent storage area for the OS, various programs, and various types of data, and as a short-term storage area for various types of data.

The input IN 205 is an I/F for connecting the input unit 206 to the client apparatus 200. Operation instructions from the input unit 206 are input to the client apparatus 200 via the input I/F 205. Examples of the input unit 206 are user-operable input/output (I/O) devices, including a keyboard and a pointing device such as a mouse.

The display IN 207 is an IN for connecting the display unit 208 to the client apparatus 200. An image to be displayed on the display unit 208 is transmitted to the display unit 208 via the display IN 207. The display unit 208 includes a monitor, such as a liquid crystal display (LCD). The communication I/F (obtaining unit) 209 performs data transmission and reception with the camera 100 via the network 300. The communication I/F 209 can convert data stored in the primary storage device 203 and the secondary storage device 204 into a predetermined format, and transmit the converted data to the camera 100.

The camera 100 includes an imaging unit instead of the input I/F 205, the input unit 206, the display I/F 207, and the display unit 208 in FIG. 2. The imaging unit includes a lens unit and an image sensor included in an imaging optical system. The lens unit includes a fisheye lens. The image sensor includes a charge-coupled device (CCD) sensor or a complementary metal-oxide-semiconductor (CMOS) sensor, and converts an image formed on its light reception surface into an electrical signal. Functions and processing of the camera 100 can be implemented by executing programs by a CPU of the camera 100 corresponding to the CPU 202.

According to the present exemplary embodiment, the client apparatus 200 operates as an image processing apparatus that performs the image analysis processing on the image captured by the camera 100 and performs display control to display the processing result on the display unit 208. However, the camera 100 that is an imaging apparatus may operate as the foregoing image processing apparatus. An ordinary PC or other devices may operate as the foregoing image processing apparatus.

Figure 3:
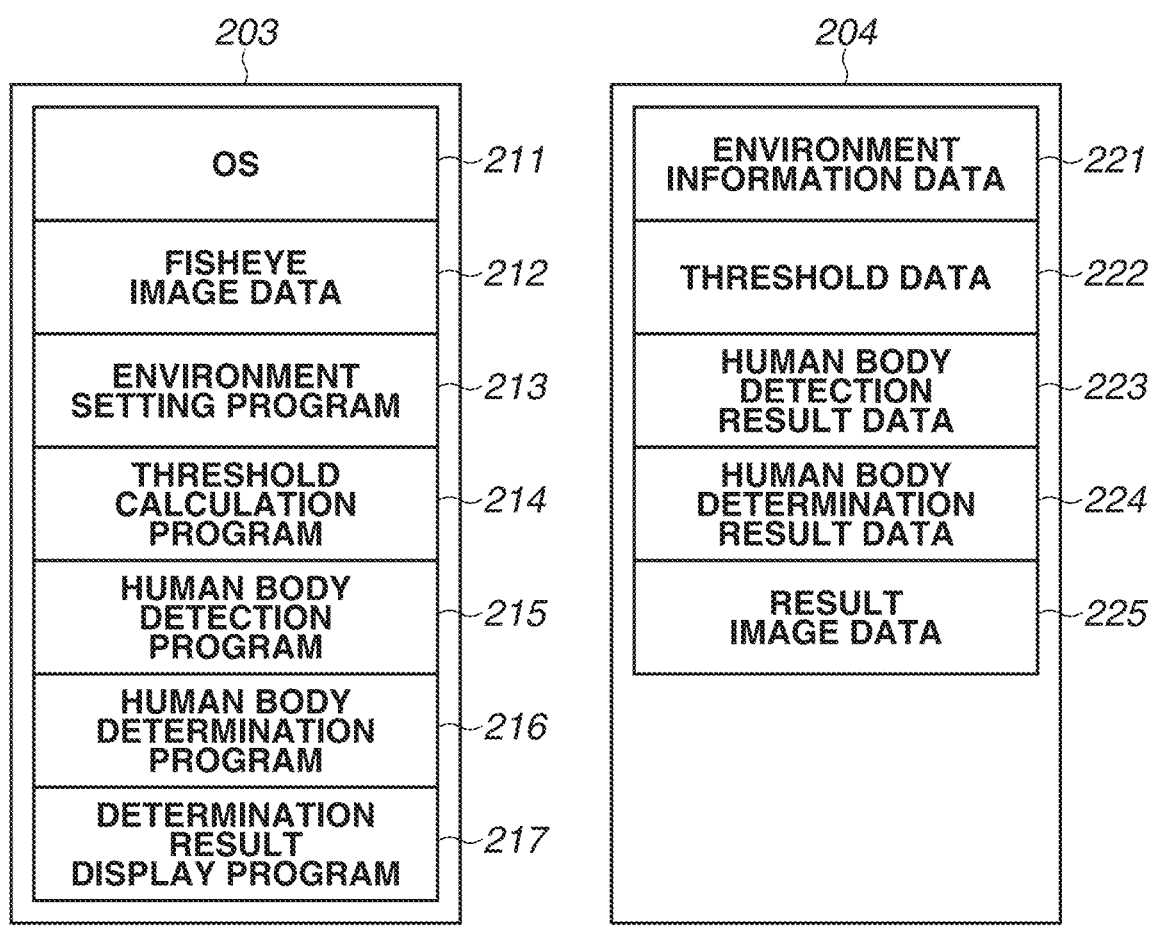
FIG. 3 is a diagram illustrating an example of information stored in a primary storage device and a secondary storage device.

FIG. 3 is a diagram illustrating an example of various programs and various types of data stored in the primary storage device 203 and the secondary storage device 204 of the client apparatus 200.

As illustrated in FIG. 3, the primary storage device 203 stores an OS 211, fisheye image data 212, an environment setting program 213, a threshold calculation program 214, a human body detection program 215, a human body determination program 216, and a determination result display program 217. The secondary storage device 204 stores environment information data 221, threshold data 222, human body detection result data 223, human body determination result data 224, and result image data 225.

The OS 211 is a basic program for controlling the entire client apparatus 200. The positions (addresses) and sizes of various programs (213 to 217) in the primary storage device 203 are managed by the OS 211.

The fisheye image data 212 is a target fisheye image for the image analysis processing. According to the present exemplary embodiment, a fisheye image is an image of 1000 pixels (px) in height and 1000 px in width. The image data format (such as Joint Photographic Experts Group (JPEG), bitmap, and Portable Network Graphics (PNG)) is not limited in particular. The fisheye image data 212 may be moving image data such as H.264 data and H.265 data.

The environment setting program 213 is a program for setting environment information that is input by the user via the input unit 206 and indicates an imaging environment for a fisheye image. When the user inputs the environment information using the input unit 206, the environment setting program 213 loaded into the primary storage device 203 receives the environment information via the input I/F 205 and the internal bus 201. The environment setting program 213 then stores environment information data 221 into the secondary storage device 204 via the internal bus 201. If environment information data 221 is already stored in the secondary storage device 204, the environment information data 221 is updated.

FIG. 4 is a diagram illustrating an example of the environment information data 221.

The environment information data 221 includes correspondence relationships between a distance 221a from a center and a distance 221b in a real space, an installation height 221c, and a detection target height 221d.

The distance 221a from the center refers to a distance [px] from the center coordinates of a fisheye image. The distance 221b in the real space refers to a horizontal distance [m] from the camera 100 to a position corresponding to the distance 221a from the center in the real space. According to the present exemplary embodiment, the camera 100 is installed in a horizontal orientation. The center position of the fisheye image corresponds to the installation position of the camera 100.

The installation height 221c refers to a height [m] of the camera 100 above the ground or from the floor surface in the real space. The detection target height 221d is a height [m] of a detection target object above the ground or from the floor surface in the real space. According to the present exemplary embodiment, the detection target is a human head, and the detection target height 221d indicates a lower limit value of the size (height) of the human body to be detected. According to the present exemplary embodiment, one detection target height 221d is set. However, two values such as a lower limit value and an upper limit value of the size (height) of the human body to be detected may be set as detection target heights 221d.

Figure 5:
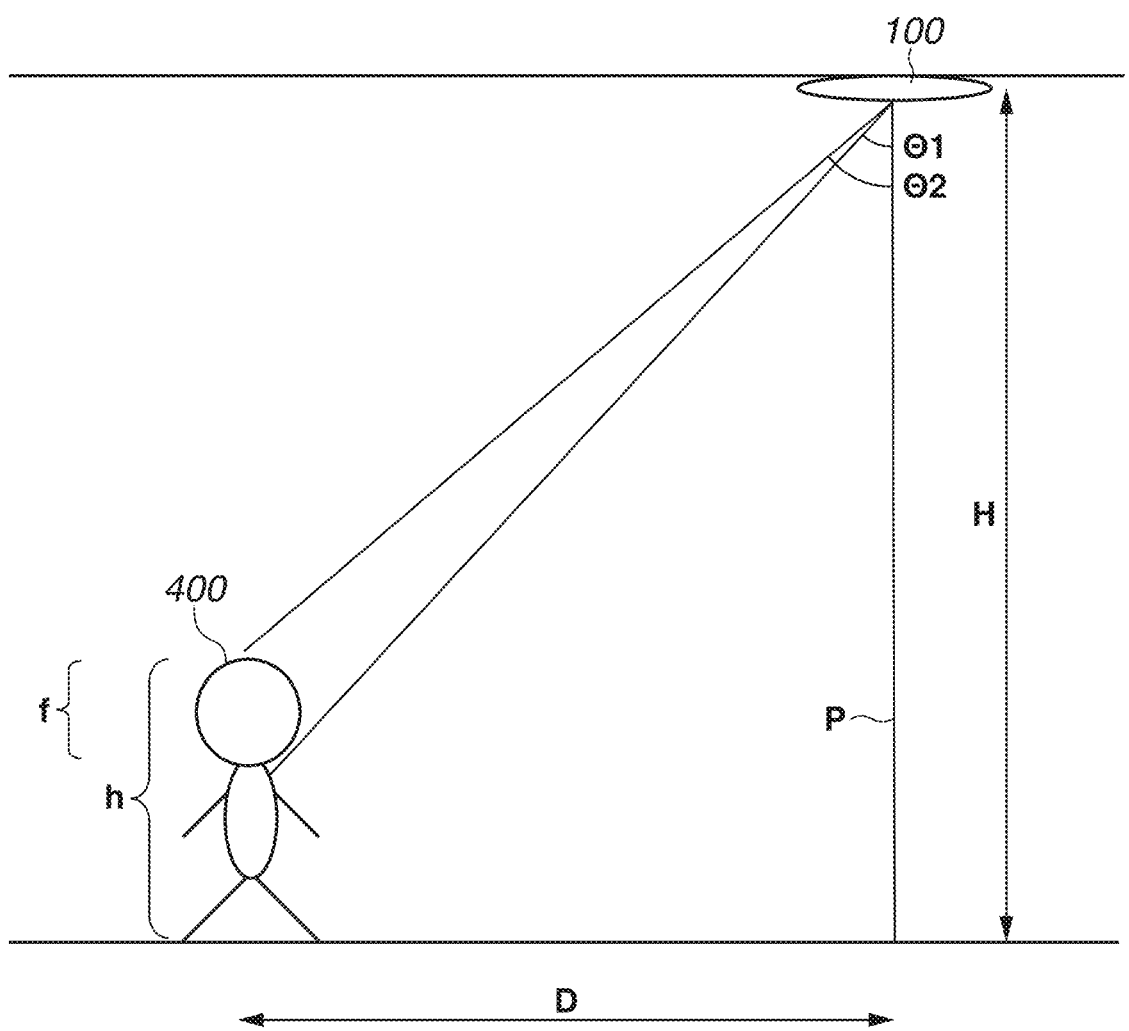
FIG. 5 is a diagram illustrating an example of an image capturing environment.

FIG. 5 is a diagram illustrating an example of the imaging environment.

As illustrated in FIG. 5, according to the present exemplary embodiment, the camera 100 is horizontally installed at a height H above the ground or from the floor surface, and captures an object 400 passing under the camera 100. In FIG. 5, the object 400 exists at a distance D horizontally from a perpendicular P extended from the camera 100 to the ground or the floor surface. The height H corresponds to the installation height 221c in FIG. 4. The distance D corresponds to the distance 221b in the real space in FIG. 4.

In FIG. 5, the symbol h represents the height of the object 400 above the ground or from the floor surface. The height h of the object 400 corresponds to the detection target height 221d in FIG. 4. The symbol f represents the size of the detection target to be detected by human body detection processing which is performed by the human body detection program 215 to be described below. According to the present exemplary embodiment, the detection target is a human head, and the size f refers to the size of the human head in the real space.

According to the present exemplary embodiment, the detection target is a human head. However, the detection target is not limited to a human head. For example, the detection target may be an entire human body or another part of a human body (for example, only the upper half of a human body). In other words, the size f varies depending on the detection target.

The angle θ1 illustrated in FIG. 5 is an angle formed between the perpendicular P and a line connecting the camera 100 and the lower end of the detection target area (according to the present exemplary embodiment, a head area) of the object 400. The angle θ2 is an angle formed between the perpendicular P and a line connecting the camera 100 and the upper end of the detection target area of the object 400. The angles θ1 and θ2 can be expressed by the following equations (1) and (2), respectively:

$$\theta 1 = \arctan\left(\frac{D}{H-h+f}\right) \quad (1)$$

$$\theta 2 = \arctan\left(\frac{D}{H-h}\right) \quad (2)$$

Return to FIG. 3. The threshold calculation program 214 calculates thresholds to be used in human body determination processing which is performed using the environment information data 221 illustrated in FIG. 4 by the human body determination program 216 to be described below. The threshold calculation program 214 stores the calculated thresholds as threshold data 222 in the secondary storage device 204. Details of the threshold calculation processing will be described below.

Figure 6:
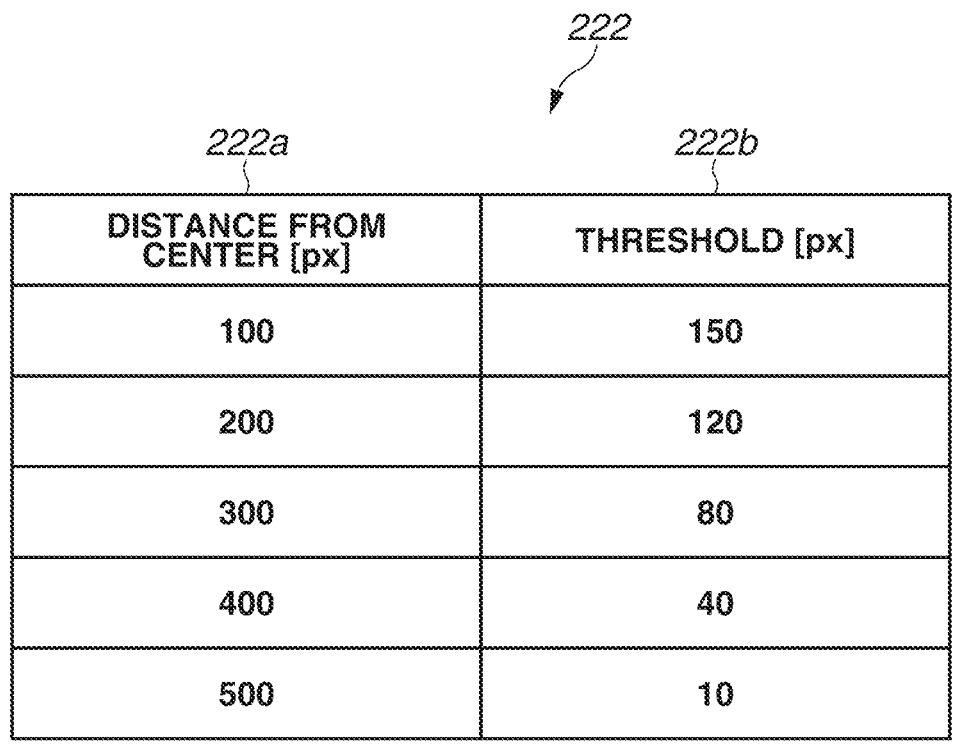
FIG. 6 is a diagram illustrating an example of threshold data.

FIG. 6 is a diagram illustrating an example of the threshold data 222.

The threshold data 222 expresses correspondence relationships between a distance 222a from a center and a threshold 222b. The distance 222a from the center refers to the distance [px] from the center coordinates of a fisheye image, and corresponds to the distance 221a from the center illustrated in FIG. 4. The threshold 222b is used to determine whether an object detected at the distance 222a from the center by the human body detection processing is a detection target object. According to the present exemplary embodiment, an object having a size greater than or equal to the foregoing threshold is determined to be a detection target object by the human body determination processing. In other words, the threshold 222b indicates a minimum size [px] of the detection target object in a fisheye image.

Figure 7:
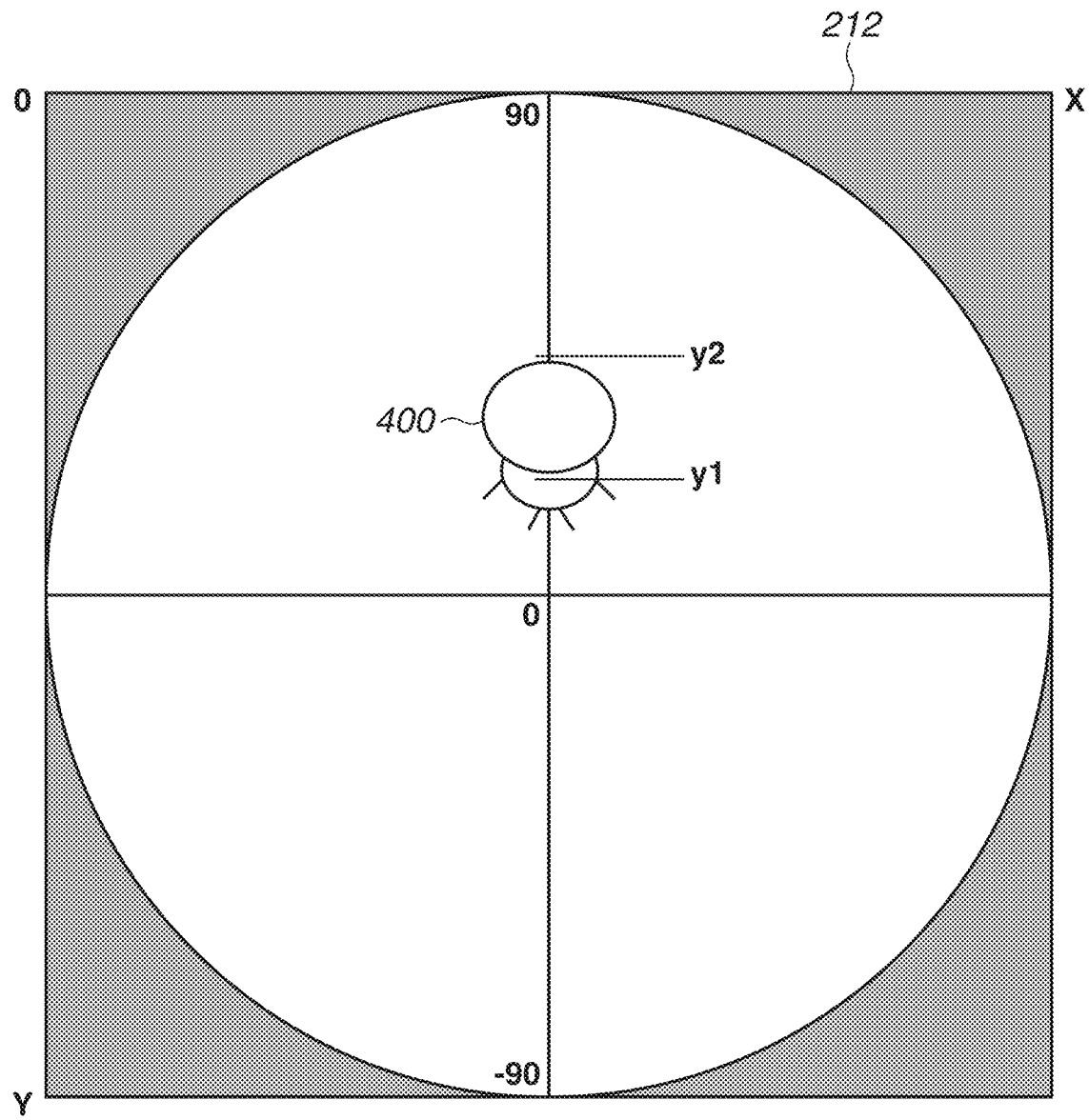
FIG. 7 is a diagram illustrating an example of a captured image.

FIG. 7 is a diagram illustrating an example of fisheye image data 212 captured by the camera 100.

In FIG. 7, X represents the maximum value in an x-coordinate direction of the camera 100. According to the present exemplary embodiment, X=1000 px. Similarly, Y represents the maximum value in a y-coordinate direction of the camera 100. According to the present exemplary embodiment, Y=1000 px.

In FIG. 7, y1 is the y coordinate of the lower end of the detection target area of the object 400 and y2 is the y coordinate of the upper end of the detection target area of the object 400. Here, y1=(Y/2)×(1−θ1/90), and y2=(Y/2)×(1−θ2/90). Note that the angles θ1 and θ2 are specified in degrees, although alternatively a different unit of angle could instead be used, such as radians. The size of the detection target area in a fisheye image, y1−y2, is expressed by the following equation:

$$y1 - y2 = \frac{Y}{2}\left(\frac{\theta 2 - \theta 1}{90}\right) \quad (3)$$

In a fisheye image, objects of the same size appear in extremely different sizes in a case where the objects are present near the center and near the circumference of the image. In other words, a detection target area size near the center and a detection target area size near the circumference are different from each other in an image. The closer to the center of an image, the larger the detection target area.

Then, according to the present exemplary embodiment, the threshold 222b to be set as the minimum size of a detection target area is changed depending on the distance from a reference position in a fisheye image. Specifically, while the center position of a fisheye image corresponding to an installation position of the camera 100 is set as the reference position, the threshold 222b is changed to a smaller threshold as the distance 222a from the center position of the fisheye image increases as illustrated in FIG. 6 and the threshold 222b which has been changed is set. This can prevent, for example, an object having a size improbably small as a captured detection target object captured near the center of the fisheye image from being detected as a detection target object.

Return to FIG. 3. The human body detection program 215 performs the human body detection processing for detecting a human body from a fisheye image based on the fisheye image data 212 loaded in the primary storage device 203. In the human body detection processing, detection techniques such as a pattern matching involving learning of a human body shape in advance can be used. The human body detection processing is not limited thereto, and any detection technique can be used.

According to the present exemplary embodiment, the human body detection processing detects a human body area having a human body shape from a fisheye image, and detects a head area to be a detection target area from the human body area. The position (coordinates) and size of the detection target area in the fisheye image are then detected and stored into the secondary storage device 204 as human body detection result data 223. The human body detection program 215 retains a minimum detectable size of a human body, and detects a human body area greater than or equal to the minimum size in the human body detection processing.

If the fisheye image data 212 is not still image data but moving image data, the human body detection program 215 performs decoding processing for obtaining a single frame from the moving image data and the human body detection processing for detecting a human body from the obtained frame. If the human body detection processing is performed on a plurality of frames, the detection results are stored frame by frame.

FIG. 8 is a diagram illustrating an example of human body detection result data 223 output by the human body detection program 215.

The human body detection result data 223 includes a detection coordinate (x) 223a, a detection coordinate (y) 223b, and a detection size 223c. The detection coordinate (x) 223a represents the x coordinate [px] of a detection target area detected by the human body detection processing. The detection coordinate (y) 223b represents the y coordinate [px] of the detection target area detected by the human body detection processing. For example, the detection coordinate (x) 223a and the detection coordinate (y) 223b can be the center coordinates of the detection target area. The detection size 223c refers to the size of the detection target area corresponding to the detection coordinate (x) 223a and the detection coordinate (y) 223b, detected by the human body detection processing. The detection size 223c corresponds to f in FIG. 5 and y1–y2 in FIG. 7.

In FIG. 3, the human body determination program 216 performs human body determination processing for comparing the threshold data 222 with the human body detection result data 223 and determining whether the object detected by the human body detection processing is a detection target object. Details of the human body determination processing will be described below. The human body determination program 216 then stores the determination result of the human body determination processing into the secondary storage device 204 as human body determination result data 224.

The determination result display program 217 superimposes the human body determination result data 224 stored in the secondary storage device 204 on the fisheye image data 212 loaded in the primary storage device 203. The determination result display program 217 then stores the result of superimposition into the secondary storage device 204 as result image data 225. The determination result display program 217 also transmits the result image data 225 to the display unit 208 via the internal bus 201 and the display I/F 207.

Next, an operation of the client apparatus 200 according to the present exemplary embodiment will be described.

Figure 9:
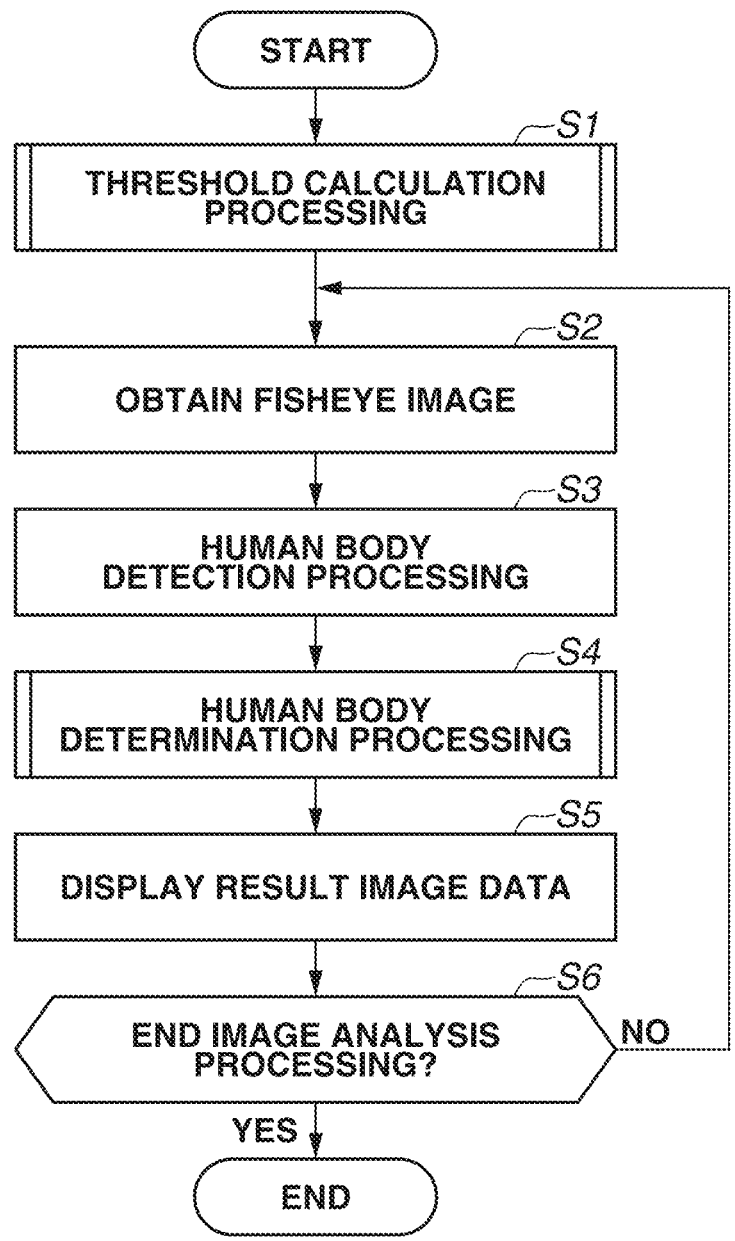
FIG. 9 is an example of a flowchart illustrating image analysis processing.

FIG. 9 is a flowchart illustrating an image analysis processing procedure performed by the client apparatus 200. The processing of FIG. 9 is started at timing of when the user operates the input unit 206 and inputs environment information. However, the start timing of the processing of FIG. 9 is not limited thereto. The client apparatus 200 can implement each step of the processing illustrated in FIG. 9 by reading and executing a needed program by the CPU 202.

In step S1, the client apparatus 200 performs the threshold calculation processing using the threshold calculation program 214. The client apparatus 200 calculates a plurality of thresholds 222b to be used in the human body determination processing from the environment information data 221 based on the distances 222a from the center of a fisheye image, and stores the thresholds 222b as threshold data 222. Details of the threshold calculation processing will be described below.

In step S2, the client apparatus 200 obtains a fisheye image captured by the camera 100. The obtained fisheye image is stored into the primary storage device 203 as fisheye image data 212.

In step S3, the client apparatus 200 performs the human body detection processing using the human body detection program 215. The client apparatus 200 performs the human body detection processing on the fisheye image obtained in step S2, and stores the detection result of a detection target (human head) as human body detection result data 223.

In step S4, the client apparatus 200 performs the human body detection processing using the human body determination program 216. The client apparatus 200 performs the human body determination processing on the object detected in step S3 by using the threshold data 222 set in step S1, and stores the determination result as human body determination result data 224.

In step S5, the client apparatus 200 performs display control to display an image analysis processing result by using the determination result display program 217. The client apparatus 200 superimposes the determination result determined in step S4 on the fisheye image obtained in step S2 to generate an image, and stores the generated image as result image data 225. The client apparatus 200 also perform display control to display the result image data 225 on the display unit 208.

In step S6, the client apparatus 200 determines whether to end the image analysis processing. If the client apparatus 200 determines to continue the image analysis processing (NO in step S6), the processing returns to step S2. If the client apparatus 200 determines to end the image analysis processing (YES in step S6), the processing illustrated in FIG. 9 ends.

Figure 10:
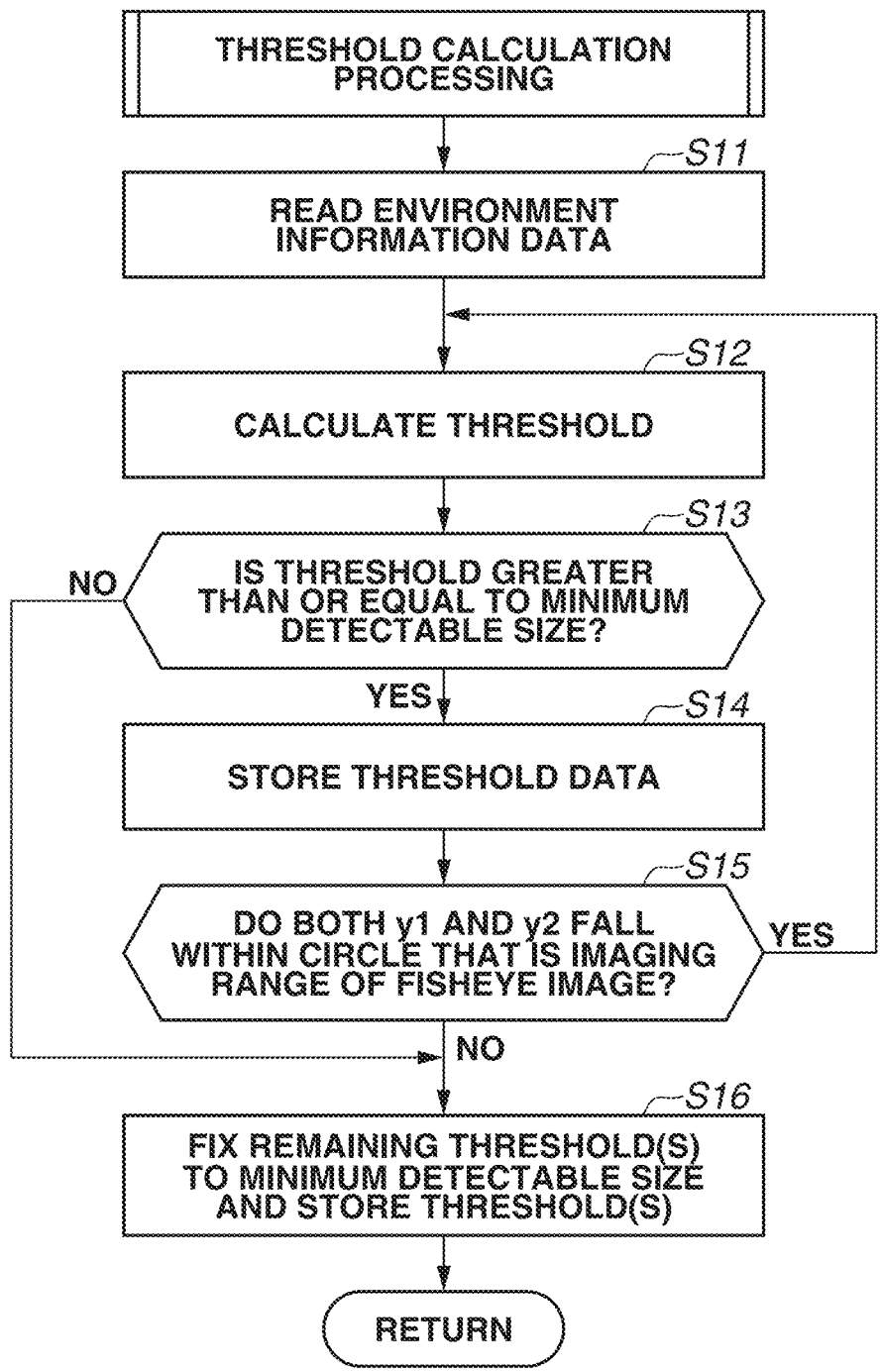
FIG. 10 is an example of a flowchart illustrating threshold calculation processing.

FIG. 10 is a flowchart illustrating the threshold calculation processing performed in step S1 of FIG. 9. In step S11, the client apparatus 200 reads the environment information data 221 stored in the secondary storage device 204. The processing proceeds to step S12.

In the processing of step S12 and the subsequent steps, the client apparatus 200 calculates thresholds 222b each corresponding to a different one of the distances 221a from the center in ascending order of the distances 221a from the center among the pieces of the environment information data 221 read in step S11, and stores the threshold data 222. For example, if the environment information data 221 illustrated in FIG. 4 is read in step S11, the client apparatus 200 first calculates a threshold 222b for a case where the distance 221a from the center is 100 px, and then calculates thresholds 222b in order of 200 px, 300 px, and so on.

In step S12, the client apparatus 200 calculates a threshold (y1−y2) corresponding to the distance 221a from the center by using the foregoing equations (1) to (3) based on the environment information data 221 read in step S11.

Specifically, the client apparatus 200 calculates the angles θ1 and θ2 illustrated in FIG. 5 based on the foregoing equations (1) and (2). The angles θ1 and θ2 are calculated using H that is the installation height 221c included in the environment information data 221. The detection target height 221d included in the environment information data 221 is h. The size of the human head to be detected is f. A preset value or a value calculated based on the detection target height 221d may be used as f. The distance 221b in the real space corresponding to the distance 221a from the center is D that is included in the environment information data 221. The client apparatus 200 calculates y1−y2 based on the foregoing equation (3) by using the calculated angles θ1 and θ2, and assumes the calculation as the calculation result of the threshold 222b.

In step S13, the client apparatus 200 determines whether the threshold 222b calculated in step S12 is greater than or equal to a lower limit value set in advance. Here, the lower limit value is the minimum size (minimum detectable size) at which the detection target object (head) can be detected. If the threshold 222b is greater than or equal to the minimum detectable size (YES in step S13), the processing proceeds to step S14. If the threshold 222b is less than the minimum detectable size (NO in step S13), the processing proceeds to step S16.

In step S14, the client apparatus 200 stores the threshold 222b calculated in step S12 into the secondary storage device 204 as threshold data 222. As illustrated in FIG. 6, the client apparatus 200 here stores the threshold 222b in association with the distance 222a from the center.

In step S15, the client apparatus 200 determines whether both the coordinates y1 and y2 used in calculating the threshold 222b fall within a circle that is the imaging range of the fisheye image. If both the coordinates y1 and y2 fall within the circle (YES in step S15), the processing returns to step S12. In step S12, the client apparatus 200 then changes the distance 221a from the center to the increased one among the pieces of the environment information data 221, and calculates a threshold 222b again. On the other hand, if at least either one of the coordinates y1 and y2 falls outside the circle (NO in step S15), the processing proceeds to step S16.

In step S16, the client apparatus 200 fixes threshold(s) 222b to the minimum detectable size. The threshold(s) 222b fixed in step S16 corresponds to the remaining distance(s) 221a from the center among the pieces of the environment information data 221 for which no threshold 222b has been calculated, and stores the threshold(s) 222b as threshold data 222.

Figure 11:
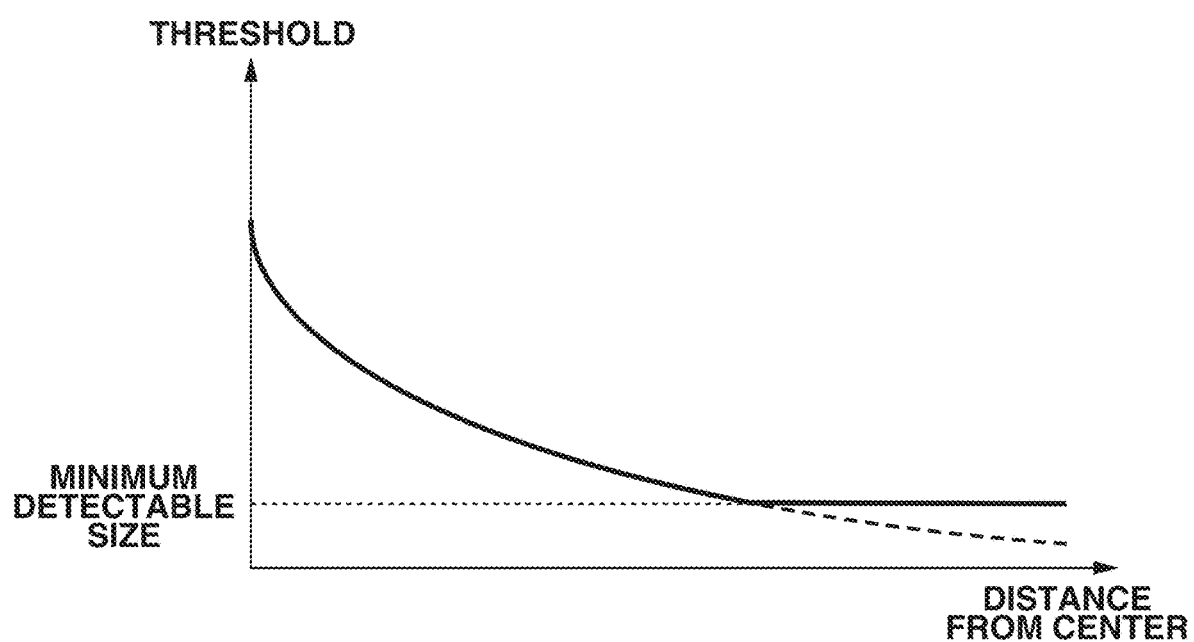
FIG. 11 is a diagram illustrating changes in threshold.

FIG. 11 is a chart illustrating a relationship between the distance from the center of the fisheye image and the threshold. As illustrated in FIG. 11, the greater the distance from the center of the fisheye image, the smaller the threshold is set to be. The area that is a predetermined distance or more from the center is a minimum size fixed area in which the threshold is fixed to the minimum detectable size. The threshold is thus set to a threshold which has been changed in a concentric circular manner about the center position of the fisheye image, and is fixed to the minimum detectable size in a circumferential area having a predetermined radius or more.

Figure 12:
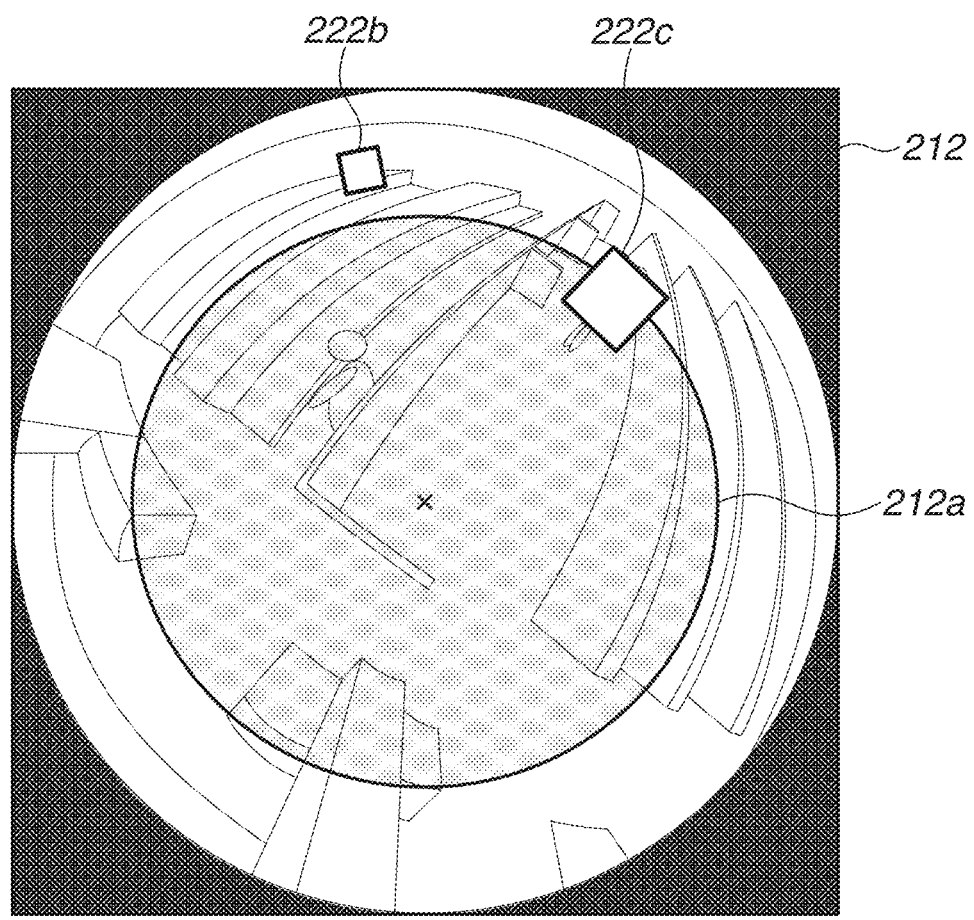
FIG. 12 is a diagram illustrating a setting example of the threshold.

More specifically, as illustrated in FIG. 12, a threshold 222c of the same size is set on a circle 212a on which the distances from the center position (marked with x in the diagram) of the fisheye image are the same in the circle that is the imaging range of the fisheye image data 212. In the area outside the circle 212a, a threshold 222b smaller than the threshold 222c is set.

Since fisheye images do not provide an erect image of an object, the thresholds to be used in the human body determination processing may be set to be perpendicular to lines passing through the center of the fisheye image as illustrated in FIG. 12.

Figure 13:
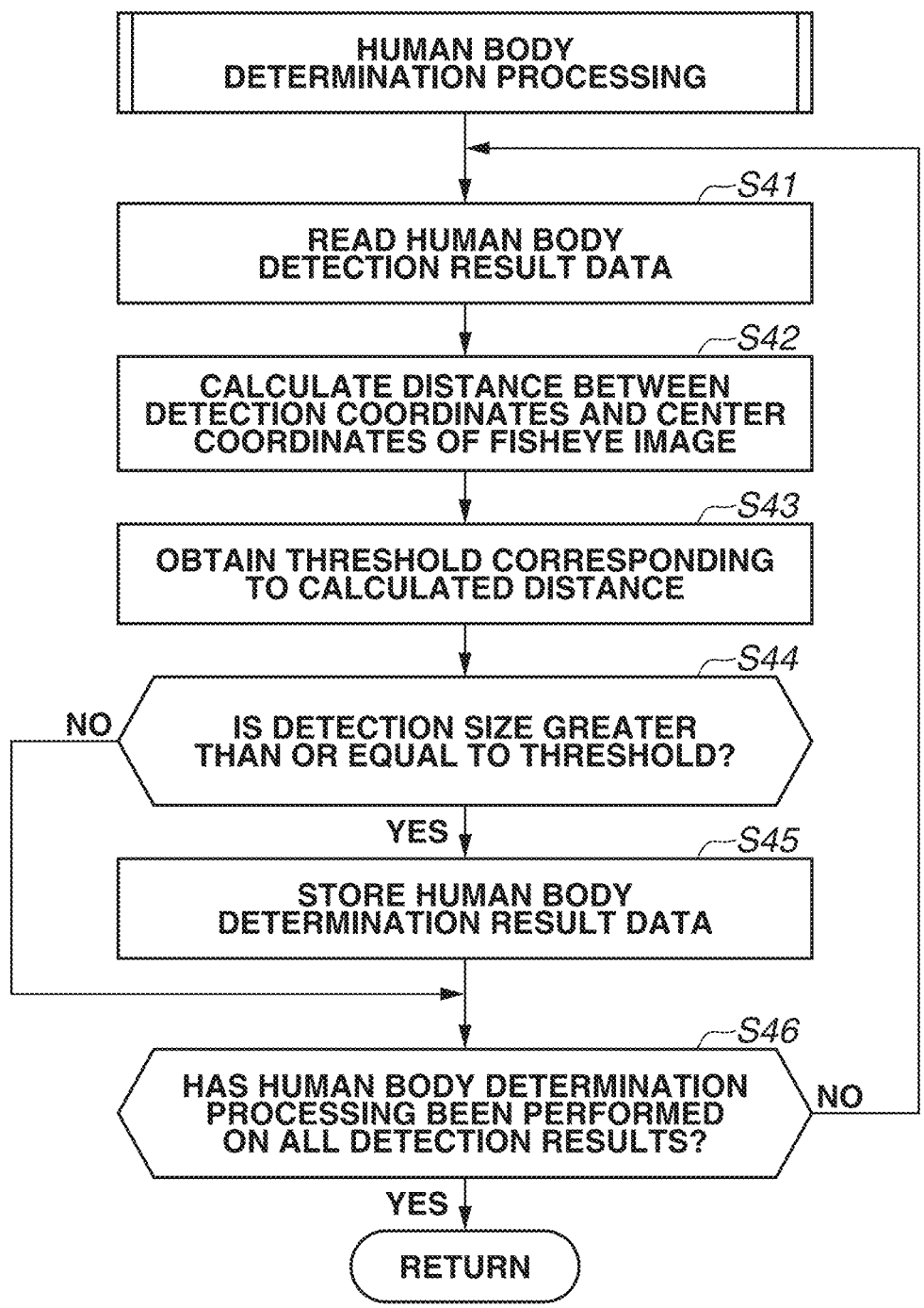
FIG. 13 is an example of a flowchart illustrating human body determination processing.

FIG. 13 is a flowchart illustrating the human body determination processing performed in step S4 of FIG. 9. In step S41, the client apparatus 200 reads the human body detection result data 223 stored in the secondary storage device 204, and selects a detection result to be a determination target. The processing proceeds to step S42.

In step S42, the client apparatus 200 calculates the distance between the detection coordinates and the center coordinates of the fisheye image based on the detection coordinate (x) 223a and the detection coordinate (y) 223b included in the human body detection result data 223, and the image sizes X and Y of the fisheye image data 212.

In step S43, the client apparatus 200 reads the threshold data 222 stored in the secondary storage device 204. The client apparatus 200 then obtains a threshold 222b corresponding to a value closest to the distance calculated in step S42 from among the distances 222a from the center included in the threshold data 222.

In step S44, the client apparatus 200 compares the detection size 223c included in the human body detection result data 223 with the threshold 222b obtained in step S43. If the detection size 223c is greater than or equal to the threshold 222b (YES in step S44), the processing proceeds to step S45. If the detection size 223c is smaller than the threshold 222b (NO in step S44), the processing proceeds to step S46.

In step S45, the client apparatus 200 stores the detection result of the determination target into the secondary storage device 204 as human body determination result data 224. The processing proceeds to step S46.

In step S46, the client apparatus 200 determines whether the human body determination processing has been performed on all the detection results included in the human body detection result data 223. If there is an undetermined detection result (NO in step S46), the processing returns to step S41. In step S41, the client apparatus 200 selects the undetermined detection result as a determination target. The processing of step S42 and the subsequent steps is then repeated. On the other hand, if the human body determination processing has been completed on all the detection results (YES in step S46), the processing of FIG. 13 ends.

As has been described above, the image processing apparatus (client apparatus 200) according to the present exemplary embodiment obtains a fisheye image captured by the camera 100, and performs the image analysis processing for detecting an object of a specific size as a detection target object from the obtained fisheye image. The image analysis processing includes the human body detection processing for detecting a human head as the detection target object from the fisheye image, and the human body determination processing for determining whether the object detected by the human body detection processing is a detection target object. The image processing apparatus sets the size of a detection target object to be detected by the image analysis processing, i.e., the threshold to be used in the human body determination processing, which has been changed depending on the distance from the reference position in the fisheye image.

This can prevent an object having an improbable size as a captured detection target object from being detected as a detection target object and improve detection accuracy in detecting a human body from an fisheye image.

According to the present exemplary embodiment, the image processing apparatus sets a minimum size of a detection target object as the threshold to be used in the human body determination processing. In the human body determination processing, the image processing apparatus detects an object having a size greater than or equal to the set threshold as a detection target object. This can prevent an object having a size improbably small as a captured detection target object from being detected as a detection target object and improve detection accuracy in detecting a detection target object from the fisheye image.

In setting of a threshold, with a position corresponding to directly below the installation position of the camera 100 in the fisheye image as a reference position, the image processing apparatus may change the threshold to a smaller threshold as the distance from the reference position increases and set the changed threshold. Specifically, the image processing apparatus sets the threshold to a threshold which is changed in a concentric circular manner about the center coordinates of the fisheye image that are the reference position.

As illustrated in FIG. 5, objects exist at positions at equal distances from the center in the fisheye image captured by the camera 100 horizontally arranged on the ceiling are located at horizontally equal distances from the installation position of the camera 100 in the real space. By setting the threshold to a threshold which has been changed in a concentric circular manner as described above, the thresholds to be used in the human body determination processing for the objects located at equal distances from the camera 100 in the real space can be set to the same values. This allows appropriate detection of detection target objects.

The image processing apparatus sets the minimum size (minimum detectable size) of an object detectable by the human body detection processing as the lower limit value of the threshold, and fixes the threshold to the minimum detectable size for an area which is a predetermined distance or more from the center of the fisheye image. This can prevent the threshold to be used in the human body detection processing near the circumference of the fisheye image from being set to a size smaller than the minimum detectable size in the human body detection processing.

The image processing apparatus obtains the installation height of the camera 100, the installation orientation (installation angle) of the camera 100, the height of a detection target object in the real space, and the size of the detection target object in the real space as the environment information indicating the imaging environment of the fisheye image. The image processing apparatus then sets the threshold to be used in the human body determination processing based on the obtained environment information. The threshold can thus be appropriately set in consideration of what size the detection target object is in the fisheye image. Since the image processing apparatus can obtain user-input environment information, the image processing apparatus can appropriately set the threshold based on the size (height) of a human body that the user wants to detect.

As described above, according to the present exemplary embodiment, the threshold to be used on the fisheye image in the human body determination processing can be appropriately set in consideration of the minimum detectable size in the human body detection processing based on the installation condition of the camera 100 and the size of the detection target object in the real space. This can improve the accuracy of human body detection using an omnidirectional camera.

(Modifications)

Figure 14:
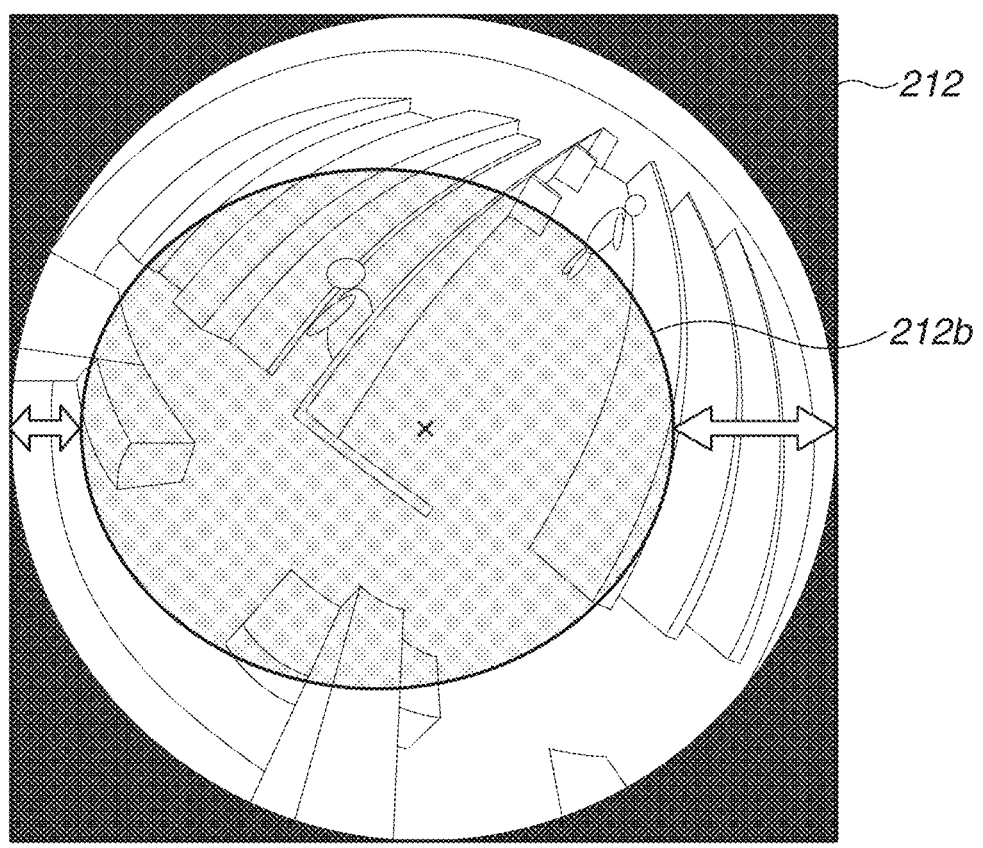
FIG. 14 illustrates a setting example of the threshold when a network camera is tilted.

According to the foregoing exemplary embodiment, the installation orientation of the camera 100 is horizontal. However, the installation orientation of the camera 100 may be oblique to the horizontal direction. If the camera 100 is tilted, the same distances in the fisheye image can be different in the real space. In such a case, the thresholds to be used in the human body determination processing for positions in the fisheye image which are at an equal distance away from the installation position of the camera 100 in the real space are set to the same value based on the installation orientation of the camera 100. More specifically, as illustrated in FIG. 14, a threshold of the same size is set on a circle 212b obtained by distorting a circle about the center position (marked with x in the diagram) of the fisheye image 212.

In such a case, the environment information data 221 illustrated in FIG. 4 may include a table indicating correspondence relationships between the distance 221a from the center and the distance 221b in the real space at each angle, with the perpendicular extended from the center of the fisheye image as a reference for 0°. Similarly, the threshold data 222 illustrated in FIG. 6 may include a table indicating correspondence relationships between the distance 222a from the center and the threshold 222b at each angle.

According to the foregoing exemplary embodiment, the threshold used in the human body determination processing is the minimum size of the detection target area. However, the threshold may be a maximum size of the detection target area. In such a case, the human body determination processing determines an object having a size smaller than or equal to the threshold as a detection target object. This can prevent an object having a size improbably large as a captured detection target object from being detected as a detection target object and improve the detection accuracy in detecting a detection target object from an fisheye image. Both a first threshold indicating the minimum size of the detection target area and a second threshold indicating the maximum size of the detection target area may be set as thresholds used in the human body determination processing.

According to the foregoing exemplary embodiment, the threshold used in the human body determination processing is set to a threshold which has been changed in a concentric circular manner in the fisheye image. However, the threshold may be set to a threshold which has been changed in a concentric polygonal manner or a concentric rectangular manner.

According to the foregoing exemplary embodiment, as illustrated in FIG. 6, the threshold data 222 is set in such a manner that the distances 222a from the center and the thresholds 222b are associated with each other. However, thresholds may be set for respective areas into which the fisheye image is divided based on the distance from the center. The number of divided areas is not limited in particular. For example, the fisheye image may be divided into two areas, namely, a central area and a circumferential area, and thresholds may be set for the respective areas.

According to the foregoing exemplary embodiment, the human body detection program 215 and the human body determination program 216 are separately provided, and a detection target object is determined using the threshold from among objects detected by the human body detection processing. However, processing for detecting an object having a specific size, for example, an object having a size greater than or equal to the threshold as a detection target object may be performed by a single program. In other words, the human body detection processing and the human body determination processing may be performed by a single program.

An exemplary embodiment of the present invention can be implemented by processing for supplying a program for implementing one or more functions of the foregoing exemplary embodiment to a system or an apparatus via a network or a storage medium, and reading and executing the program by one or more processors of a computer of the system or apparatus. A circuit for implementing one or more functions (for example, application specific integrated circuit (ASIC)) may be used for implementation.

According to the foregoing exemplary embodiments, the detection accuracy in detecting a detection target object from a fisheye image can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-044916, filed Mar. 13, 2018, which is hereby incorporated by reference herein in its entirety.

What is claimed is:

1. An image processing apparatus comprising:
   an obtaining unit configured to obtain a fisheye image captured by an imaging unit including a fisheye lens;
   a detection unit configured to detect an object in the fisheye image obtained by the obtaining unit;
   a setting unit configured to set, based on a distance from a reference position in the fisheye image to a given position in the fisheye image, a minimum size corresponding to the given position, wherein the minimum size is set to decrease as the distance increases; and
   an output unit configured to output a detection result by the detection unit, wherein a given object detected at the given position in the fisheye image is excluded from the detection result, if a size of the given object detected at the given position is smaller than the minimum size corresponding to the given position.

2. The image processing apparatus according to claim 1, wherein the reference position is a center in the fisheye image.

3. The image processing apparatus according to claim 1, wherein the minimum size is set such that a value of the minimum size is same in a concentric circular about the reference position.

4. The image processing apparatus according to claim 1, wherein the setting unit sets a same value of the minimum size at positions in the fisheye image based on an installation orientation of the imaging unit, the positions being at an equal distance away from the installation position of the imaging unit in a real space.

5. The image processing apparatus according to claim 1, wherein the setting unit sets the minimum size based further on at least one of an installation orientation of the imaging unit, a height of the detection target object in a real space, and a size of the object in the real space.

6. The image processing apparatus according to claim 1, wherein the detection unit detects a human body or a part of a human body as the object.

7. An image processing method comprising:
   obtaining a fisheye image captured by an imaging unit including a fisheye lens;
   detecting an object in the fisheye image obtained in the obtaining;
   setting, based on a distance from a reference position in the fisheye image to a given position in the fisheye image, a minimum size corresponding to the given position, wherein the minimum size is set to decrease as the distance increases; and
   outputting a detection result in the detecting, wherein a given object detected at the given position in the fisheye image is excluded from the detection result, if a size of the given object detected at the given position is less than the minimum size corresponding to the given position.

8. A non-transitory storage medium storing a program for causing a computer to function as:
   an obtaining unit configured to obtain a fisheye image captured by an imaging unit including a fisheye lens;
   a detection unit configured to detect an object in the fisheye image obtained by the obtaining unit;
   a setting unit configured to set, based on a distance from a reference position in the fisheye image to a given position in the fisheye image, a minimum size corresponding to the given position, wherein the minimum size is set to decrease as the distance increases; and an output unit configured to output a detection result by the detection unit, wherein a given object detected at the given position in the fisheye image is excluded from the detection result, if a size of the given object detected at the given position is smaller than the minimum size corresponding to the given position.

9. An image processing apparatus comprising:

an obtaining unit configured to obtain a fisheye image captured by an imaging unit including a fisheye lens;

a detection unit configured to detect an object in the fisheye image obtained by the obtaining unit;

a setting unit configured to set, based on a distance from a reference position in the fisheye image to a given position in the fisheye image, a maximum size corresponding to the given position, wherein the maximum size is set to decrease as the distance increases; and an output unit configured to output a detection result by the detection unit, wherein a given object detected at the given position in the fisheye image is excluded from the detection result, if a size of the given object detected at the given position is larger than the maximum size corresponding to the given position.

10. The image processing apparatus according to claim 9, wherein the reference position is a center in the fisheye image.

11. The image processing apparatus according to claim 9, wherein the maximum size is set such that a value of the maximum size is same in a concentric circular about the reference position.

12. The image processing apparatus according to claim 9, wherein the setting unit sets a same value of the maximum size at positions in the fisheye image based on an installation orientation of the imaging unit, the positions being at an equal distance away from the installation position of the imaging unit in a real space.

13. The image processing apparatus according to claim 9, wherein the setting unit sets the maximum size based further on at least one of an installation orientation of the imaging unit, a height of the detection target object in a real space, and a size of the object in the real space.

14. The image processing apparatus according to claim 9, wherein the detection unit detects a human body or a part of a human body as the object.

15. An image processing method comprising:

obtaining a fisheye image captured by an imaging unit including a fisheye lens;

detecting an object in the fisheye image obtained in the obtaining;

setting, based on a distance from a reference position in the fisheye image to a given position in the fisheye image, a maximum size corresponding to the given position, wherein the maximum size is set to decrease as the distance increases; and outputting a detection result in the detecting, wherein a given object detected at the given position in the fisheye image is excluded from the detection result, if a size of the given object detected at the given position is larger than the maximum size corresponding to the given position.

16. A non-transitory storage medium storing a program for causing a computer to function as:

an obtaining unit configured to obtain a fisheye image captured by an imaging unit including a fisheye lens;

a detection unit configured to detect an object in the fisheye image obtained by the obtaining unit;

a setting unit configured to set, based on a distance from a reference position in the fisheye image to a given position in the fisheye image, a maximum size corresponding to the given position, wherein the maximum size is set to decrease as the distance increases; and an output unit configured to output a detection result by the detection unit, wherein a given object detected at the given position in the fisheye image is excluded from the detection result, if a size of the given object detected at the given position is larger than the maximum size corresponding to the given position.

17. The image processing apparatus according to claim 1, wherein the setting unit further sets a maximum size corresponding to the given position, such that the maximum size is getting smaller as the distance increases, and wherein the given object detected at the given position in the fisheye image is excluded from the detection result, if the size of the given object detected at the given position is smaller than the minimum size corresponding to the given position or larger than the maximum size corresponding to the given position.

* * * * *